S. T. GODFREY.
Potato Planter.
No. 98,687.   Patented Jan. 11, 1870.
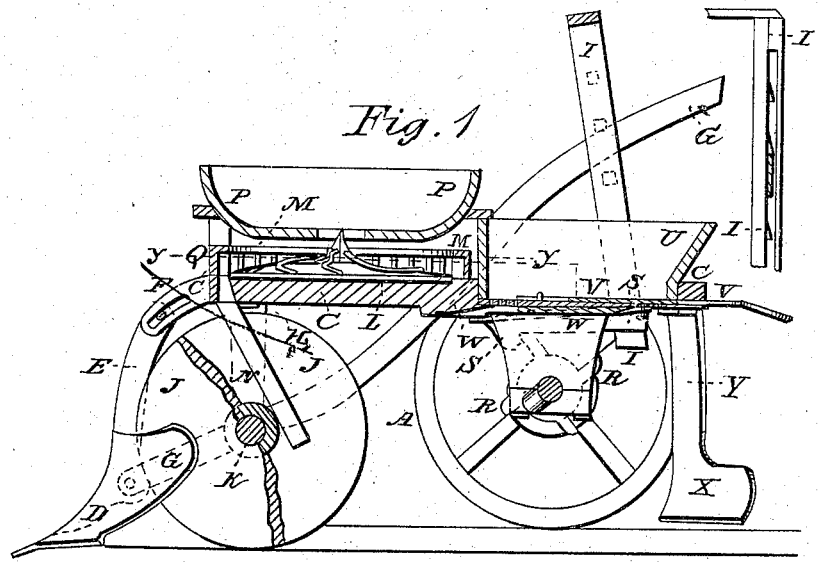
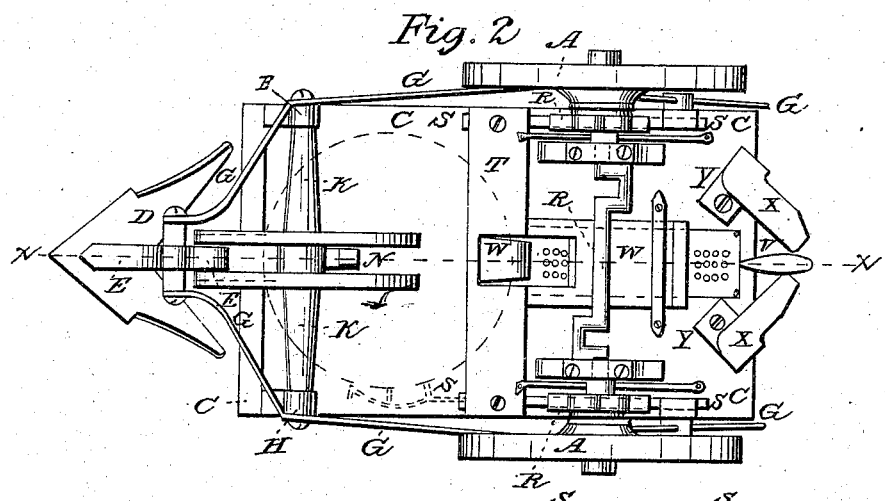
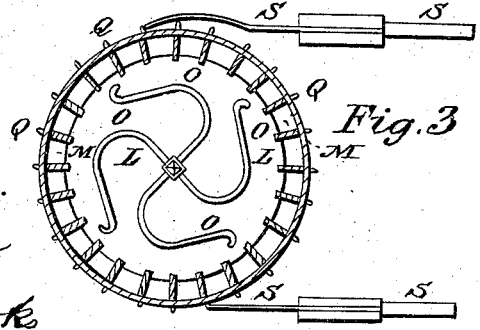
Witnesses:
Geo. W. Mabee
Mott Brook
Inventor:
S. T. Godfrey
per [signature]
Attys

United States Patent Office.

S. T. GODFREY, OF SEAVILLE, NEW JERSEY.

Letters Patent No. 98,687, dated January 11, 1870.

IMPROVEMENT IN POTATO-PLANTER.

The Schedule referred to in these Letters Patent and making part of the same.

*To all whom it may concern:*

Be it known that I, S. T. GODFREY, of Seaville, in the county of Cape May, and State of New Jersey, have invented a new and improved Potato-Planter; and I do hereby declare that the following is a full, clear, and exact description thereof, which will enable others skilled in the art to make and use the same, reference being had to the accompanying drawing, forming part of this specification, in which—

Figure 1 is a detail longitudinal sectional view of my improved machine, taken through the line $x\ x$, fig. 2.

Figure 2 is an underside view of the same.

Figure 3 is a detail horizontal section of the dropping-wheel, taken through the line $y\ y$, fig. 1.

Figure 4 is a detail view of a portion of the uprights for holding the levers.

Similar letters of reference indicate corresponding parts.

My invention has for its object to furnish a simple, convenient, and effective machine for planting potatoes, and which shall be so constructed and arranged as to drop a portion of some suitable fertilizer upon the seed before it is covered; and It consists in the construction and combination of various parts of the machine, as hereinafter more fully described.

A are the drive-wheels, which are rigidly attached to the axle B, so as to carry the said axle with them in their revolution.

The axle B revolves in bearings in the frame or platform C, or in supports attached to said platform.

D is the furrowing-plow, which is made with a double mould-board, and is attached to the lower end of the standard E, the upper end of which is placed between the ends of the arms F attached to the forward end of the frame or platform C.

The standard E is secured to the arms F, by a pin passing through and secured to the upper end of the standard E, and passing through a slot in the arms F, so that the plow and plow-standard may be raised and lowered, according to the depth at which the plow is desired to run in the ground, or to raise the plow out of the ground, when desired.

To the lower end of the standard E, or to supports attached to the lower end of said standard, are pivoted the forward ends of the levers G, which are pivoted to the lower ends of the standards H, the upper ends of which are securely attached to the forward part of the platform or frame C, so that the forward parts of the said levers G may sustain the draught-strain upon the plow.

The rear parts of the levers G extend back, and pass through vertical slots in the standards I attached to the rear part of the frame or platform C.

The rear ends of the levers G extend back, into such a position that they may be conveniently reached and operated to adjust the position of the plow, or to raise it from the ground, when desired.

In the lower part of the slotted posts or standards I are placed stops, to support the levers when the plow is raised from the ground, and also to enable the drive-wheel B to be raised from the ground, allowing the weight of the machine to be supported upon the forward or furrow-wheel, for convenience in turning. The slotted standards I may also be provided with other stops or catches, if desired, to support the levers in any position into which they may be adjusted.

J is the forward or furrow-wheel, which is made in the form of a double wheel, the parts being placed at such a distance apart as to receive the dropping-spout N between them.

The double wheel J is placed close to and directly in the rear of the furrowing-plow D, so as to run in the bottom of the furrow opened by the said plow.

The wheel J is attached to the axle K, the ends of which are pivoted to the lower ends of the standards H.

L is the dropping-wheel, which is pivoted to the forward part of the frame or platform C, and the bottom of which is made convex, as shown in fig. 1, so that the potatoes, as they pass upon the said wheel, will roll toward its edge.

Around the edge of the wheel L is formed a circle of cells, M, each of such a size as to contain a single potato, or enough to form a hill. The cells M may be covered upon their top and outer sides, but should be open upon their inner sides and bottom, the platform C serving as a bottom to support the potatoes until they have been carried around to the opening leading into the spout N, by which they are conducted to the bottom of the furrow between the parts of the wheel J.

O is a series of guide-wires, suspended a little above the wheel L, and extending down nearly to the cells M, to guide the potatoes, and insure their passing into the cells M.

P is the hopper, which is supported or hung from a frame-work attached to the platform or frame C, and through a hole in the bottom of which the potatoes escape to the wheel L.

Around the outer edge of the dropping-wheel L is formed, or to it is attached, a series of teeth, cogs, or pins, Q, by means of which the said wheel is revolved.

To the axle B are attached two toothed or spur-wheels, R, having four teeth, more or less, according to the required distance apart of the hills formed upon them.

The teeth of the wheels R, as the machine is drawn forward, strike against shoulders formed upon the lower sides of the slides S, which slide back and forth in ways, grooves, or slots in the rear part of the platform C, and which are made to move together, by being connected with each other by the bar or plate T, which slides along the under side of the platform C.

The forward ends of the slides S rise above the platform C, and one of them is made of such a length as to strike against the teeth or pins Q of the dropping-wheel L, and revolve it through the space of one cell, M, to drop the potatoes.

The other slide S is made of such a length as to serve as a stop to prevent the wheel L from being revolved too far.

U is a hopper, placed upon the rear part of the platform C, and which is designed to receive superphosphate, or other suitable fertilizer.

At one or both ends of the bottom of the hopper U are formed openings for the escape of the fertilizer, which openings should be covered with a wire grating, or perforated plate.

V is a false bottom, sliding upon the bottom of the hopper, and which may be adjusted to cover one or the other of the discharge-openings, or to partially cover both, as may be desired.

The discharge-openings are covered upon the lower side of the bottom of the hopper, by sliding plates W attached to the slides S, or to the connecting-bar or plate T, so that, as the said slides move forward to revolve the wheel L, and drop the potatoes, the same movement may uncover the discharge-openings of the hopper, and deposit the fertilizer upon the potatoes previously dropped, the said hoppers being so arranged, that as each succeeding hill of potatoes is dropped, the fertilizer may at the same time be dropped upon the next preceing hill.

If desired, the hopper U may be provided with a sieve or screen, for the fertilizer, operated from cranks formed upon the axle B, or in any other convenient manner.

The slides S, and their attachments, are drawn back, after each forward movement, by rubber or other springs attached to them, and to the frame or platform C.

X are the coverers, the standards Y of which are attached to the rear part of the frame or platform C, in such positions that the potatoes may be covered after the fertilizer has been dropped upon them.

Having thus described my invention,

What I claim as new, and desire to secure by Letters Patent, is—

1. The dropping-wheel L, formed with a row of cells, M, around its outer edge, substantially as herein shown and described, for the purpose of receiving the potatoes, and conveying them to the conductor-spout.

2. The combination of the series of guide-rods or wires O with the revolving dropping-wheel L and cells M, substantially as herein shown and described, and for the purpose set forth.

3. The double furrow-wheel J, in combination with the plow D E and spout N, leading from the dropping-wheel L M, substantially as herein shown, and for the purpose set forth.

4. The combination of the adjustable plow and standard D E, and levers G, with the arms F, and standards H and I, attached to the frame or platform C, substantially as herein shown and described, and for the purpose set forth.

5. The combination of the toothed wheels R, slides S, and teeth or pins Q, with the axle B, frame or platform C, and revolving dropping-wheel L, substantially as herein shown and described, and for the purpose set forth.

6. The combination of the fertilizer-hopper U, and slides W, with the slides S T, frame or platform C, and dropping-device L N O, substantially as herein shown and described, and for the purpose set forth.

S. T. GODFREY.

Witnesses:
GEORGE E. GANDY,
ALEXANDER CORSON.